US010906238B1

(12) United States Patent
Agarwal et al.

(10) Patent No.: US 10,906,238 B1
(45) Date of Patent: Feb. 2, 2021

(54) SHAPE MEMORY POLYMER INKS AND METHODS OF PRINTING THE SAME

(71) Applicants: Arvind Agarwal, Miami, FL (US); Tony Thomas, Miami, FL (US); Adeyinka Idowu, Miami, FL (US); Benjamin Boesl, Miami, FL (US)

(72) Inventors: Arvind Agarwal, Miami, FL (US); Tony Thomas, Miami, FL (US); Adeyinka Idowu, Miami, FL (US); Benjamin Boesl, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/913,212

(22) Filed: Jun. 26, 2020

(51) Int. Cl.
| | |
|---|---|
| B29C 35/16 | (2006.01) |
| B29C 71/00 | (2006.01) |
| B29C 64/188 | (2017.01) |
| C08K 3/04 | (2006.01) |
| B33Y 70/00 | (2020.01) |
| B29C 64/314 | (2017.01) |
| B33Y 10/00 | (2015.01) |
| B33Y 40/20 | (2020.01) |
| B33Y 40/10 | (2020.01) |
| B29C 64/112 | (2017.01) |
| B29C 64/118 | (2017.01) |
| B33Y 70/10 | (2020.01) |
| B29K 63/00 | (2006.01) |
| B29K 105/16 | (2006.01) |
| B29K 23/00 | (2006.01) |
| B29K 507/04 | (2006.01) |

(Continued)

(52) U.S. Cl.
CPC .......... *B29C 64/188* (2017.08); *B29C 64/112* (2017.08); *B29C 64/118* (2017.08); *B29C 64/314* (2017.08); *B33Y 10/00* (2014.12); *B33Y 40/10* (2020.01); *B33Y 40/20* (2020.01); *B33Y 70/00* (2014.12); *B33Y 70/10* (2020.01); *C08K 3/046* (2017.05); *B29C 2035/1691* (2013.01); *B29K 2023/38* (2013.01); *B29K 2063/00* (2013.01); *B29K 2071/00* (2013.01); *B29K 2075/00* (2013.01); *B29K 2105/0088* (2013.01); *B29K 2105/162* (2013.01); *B29K 2105/167* (2013.01); *B29K 2507/02* (2013.01); *B29K 2507/04* (2013.01); *C08K 2201/011* (2013.01)

(58) Field of Classification Search
CPC ............ B29C 35/16; B29C 2035/1691; B29C 64/118; B29C 71/00; B29K 2023/38; B29K 2063/00; B29K 2071/00; B29K 2075/00; B29K 2105/0088; B29K 2105/162; B29K 2105/167; B29K 2507/02; B29K 2507/04; B33Y 10/00; B33Y 40/00; B33Y 40/10; B33Y 40/20; B33Y 70/10
USPC .................. 264/28, 236, 308, 331.11, 331.19
See application file for complete search history.

(56) References Cited

U.S. PATENT DOCUMENTS

2008/0145428 A1* 6/2008 Zheng ...................... A61K 8/87
 424/487
2018/0272599 A1* 9/2018 Rodriguez .............. C08L 63/00

* cited by examiner

*Primary Examiner* — Leo B Tentoni
(74) *Attorney, Agent, or Firm* — Saliwanchik, Lloyd & Eisenschenk

(57) ABSTRACT

Shape memory polymer (SMP) epoxies and composites, and methods of manufacturing the same, are provided. A three-dimensional (3D) printing technique can be used to fabricate a pure thermoset SMP epoxy. A cryogenic sprayer assisted (Continued)

extrusion type 3D printing method can be used to print SMP epoxies and composites of an SMP epoxy and a nanomaterial additive, such as graphene nanoplatelets (GNP).

16 Claims, 11 Drawing Sheets

(51) Int. Cl.
*B29K 75/00* (2006.01)
*B29K 71/00* (2006.01)
*B29K 105/00* (2006.01)
*B29K 507/02* (2006.01)

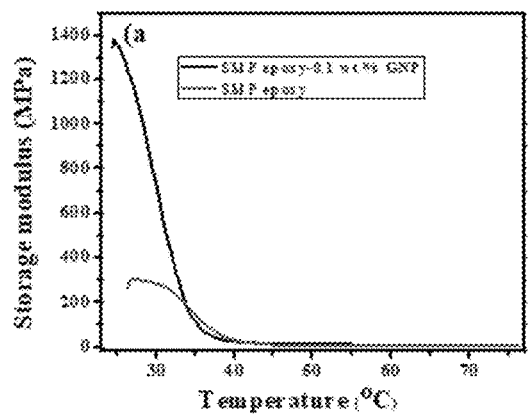 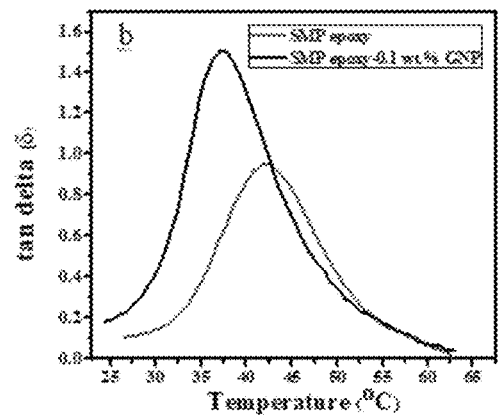
FIGS. 13(a) - 13(b)
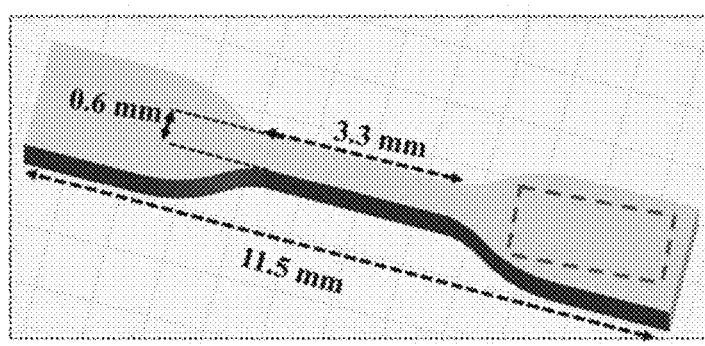 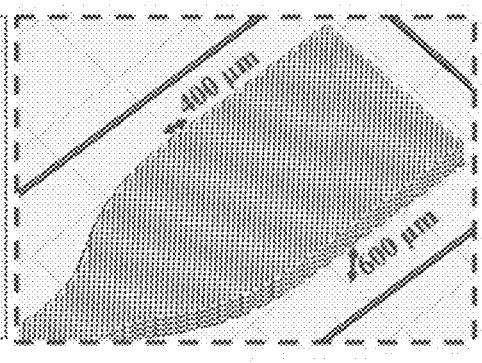
FIG. 14(a)        FIG. 14(b)

US 10,906,238 B1

SHAPE MEMORY POLYMER INKS AND METHODS OF PRINTING THE SAME

BACKGROUND

Three-dimensional (3D) printing, an additive manufacturing process, involves putting a model design into a CAD file and translating it into a three-dimensional physical object in a layer-by-layer printing fashion. Its increasing attention in industrial and academic setting is due to its robust capability to manufacture customized complex design models in a timely manner. Using conventional co-polymers as precursors, 3D printing techniques such as fused deposition modeling (FDM), stereolithography (SLA), and extrusion have demonstrated the potential to eliminate limitations associated with traditional fabricating procedures. Such limitations include inability to produce mass customization of component at low cost. Nonetheless, related art 3D printing techniques still include several limitations, including but not limited to the fact that thermoset polymers can only be 3D printed by adding them with other polymer systems, thereby tainting the properties of the thermoset polymer (i.e., pure thermoset polymers cannot be 3D printed in the related art).

BRIEF SUMMARY

Embodiments of the subject invention provide novel and advantageous shape memory polymer (SMP) epoxies and composites, and methods of manufacturing the same. A three-dimensional (3D) printing technique can be used to enable the fabrication a pure thermoset SMP epoxy. A cryogenic sprayer assisted extrusion type 3D printing method can be used to print SMP epoxies and composites of an SMP epoxy and graphene nanoplatelets (GNP). The 3D printing precursor can be freeze sprayed (e.g., at or around a temperature of 10° C. or less) during and/or after the 3D printing. The freeze spraying can be done by spraying a fluid (e.g., tetrafluropropene) on the precursor. After 3D printing, the printed sample can be subjected to a cryogenic or nearly cryogenic (e.g., a temperature of less than 0° C., such as −10° C. or less) for a predetermined period of time (e.g., 24 hours or more).

In an embodiment, a method of 3D printing an SMP-based ink can comprise: providing an SMP epoxy; curing the SMP epoxy at a first temperature (e.g., room temperature or higher) to increase its viscosity to at least 500 centipoise (cP) (e.g., 700 cP or more) and provide a first cured SMP epoxy; providing the first cured SMP epoxy to an extruder syringe; performing extrusion-based 3D printing of the first cured SMP epoxy to provide a printed SMP epoxy; freeze-spraying the printed SMP epoxy with a freezing agent at a second temperature of 10° C. or less to provide a freeze-sprayed SMP epoxy; curing the freeze-sprayed SMP epoxy at a third temperature (e.g., room temperature or higher) to provide the SMP-based ink. The method can further comprise: freeze-spraying the first cured SMP epoxy with the freezing fluid at the first temperature after the first cured SMP epoxy exits the extruder syringe while the first cured SMP epoxy is being extrusion-based 3D printed; and/or freezing the freeze-sprayed SMP epoxy at a fourth temperature of 10° C. or less for a predetermined amount of time prior to curing the freeze-sprayed SMP epoxy at the third temperature. The SMP epoxy can comprise polynorbonene, polyurethane, and/or polyether ether ketone. The freezing agent can comprise tetrafluropropene (e.g., aerosol tetrafluropropene). The SMP epoxy can comprise no polymers other than the SMP, and the SMP of the SMP epoxy can have no physical cross-linkers or chemical modification. In a further embodiment, an SMP-based ink can be fabricated by the method disclosed herein. The (fully-cured) SMP-based ink can be triggered to change shape by a thermal trigger.

In another embodiment, a method of 3D printing an SMP-composite ink can comprise: providing an SMP epoxy comprising a nanomaterial additive; curing the SMP epoxy at a first temperature (e.g., room temperature or higher) to increase its viscosity to at least 500 cP (e.g., at least 700 cP) and provide a first cured SMP epoxy; providing the first cured SMP epoxy to an extruder syringe; performing extrusion-based 3D printing of the first cured SMP epoxy to provide a printed SMP epoxy; freeze-spraying the printed SMP epoxy with a freezing agent at a second temperature of 10° C. or less to provide a freeze-sprayed SMP epoxy; curing the freeze-sprayed SMP epoxy at a third temperature (e.g., room temperature or higher) to provide the SMP-composite ink. The nanomaterial additive can be present in the SMP epoxy at a weight percentage (wt %) of 0.2 or less (e.g., 0.1 wt % or less). The method can further comprise: freeze-spraying the first cured SMP epoxy with the freezing fluid at the first temperature after the first cured SMP epoxy exits the extruder syringe while the first cured SMP epoxy is being extrusion-based 3D printed; and/or freezing the freeze-sprayed SMP epoxy at a fourth temperature of 10° C. or less for a predetermined amount of time prior to curing the freeze-sprayed SMP epoxy at the third temperature. The freezing agent can comprise tetrafluropropene (e.g., aerosol tetrafluropropene). The SMP epoxy can comprise polynorbonene, polyurethane, and/or polyether ether ketone. The nanomaterial additive can be GNP, one-dimensional (1D) carbon nanotubes (CNT), 1D boron nitride nanotubes (BNNT), and/or two-dimensional (2D) boron nitride nanoplatelets (BNNP). The SMP epoxy can comprise no polymers other than the SMP, and the SMP of the SMP epoxy can have no physical cross-linkers or chemical modification. In a further embodiment, an SMP-composite ink can be fabricated by the method disclosed herein. The SMP-composite ink can be triggered to change shape by a thermal trigger and/or an electrical trigger.

BRIEF DESCRIPTION OF DRAWINGS

FIG. 1(a) depicts a faucet to represent low viscosity and no extrudability; FIG. 1(b) depicts honey to represent partially cured SMP epoxy with increased viscosity; FIG. 1(c) shows freeze spraying of a precursor to inhibit or prevent smudging and retain the shape of the precursor; FIG. 1(d) depicts a slurry form of SMP epoxy-GNP composite, after thoroughly mixing SMP epoxy and a GNP composition together; and FIG. 1(e) shows a schematic overview of SMP epoxy and SMP epoxy-GNP formation and properties.

FIG. 13(a) is a plot of strength modulus (in MPa) versus temperature (in ° C.) for an SMP epoxy and a composite of SMP epoxy and 0.1 wt % GNP. The curve that is higher at 30° C. is for the composite, and the curve that is lower at 30° C. is for the SMP epoxy.

FIG. 13(b) is a plot of tan delta (dimensionless) versus temperature (in ° C.) for an SMP epoxy and a composite of SMP epoxy and 0.1 wt % GNP. The curve that is higher at 35° C. is for the composite, and the curve that is lower at 35° C. is for the SMP epoxy.

FIG. 14(a) is a schematic view of a 3D printed pure SMP epoxy, according to an embodiment of the subject invention.

FIG. 14(b) is a close-up of the section in FIG. 14(a) marked with the dashed square.

DETAILED DESCRIPTION

Figures 1A, 1B, 1C, 1D:
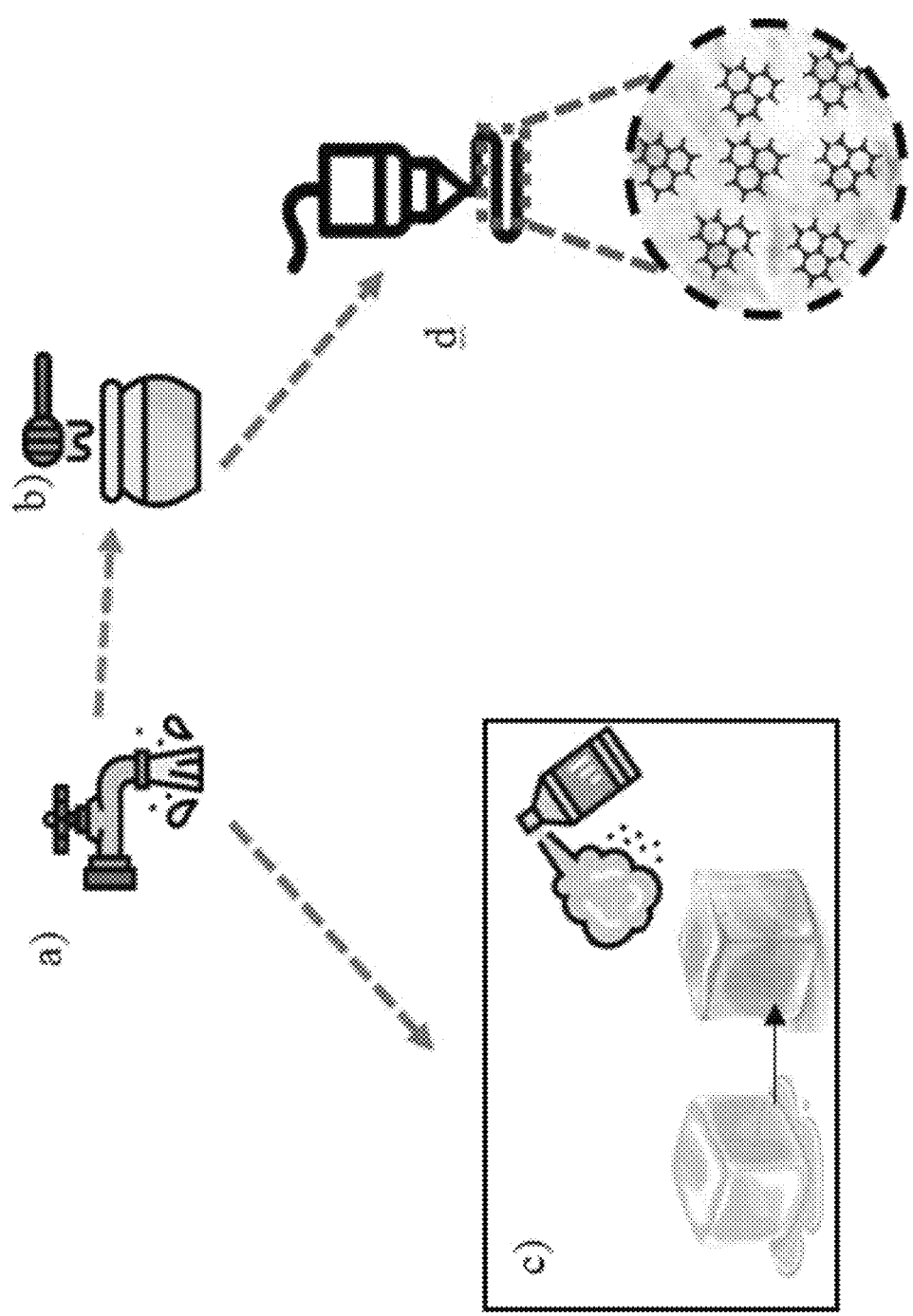
FIGS. 1(a)-1(e) are schematic views showing slurry form development of shape memory polymer (SMP) epoxy and SMP epoxy graphene nanoplatelets (GNP), according to an embodiment of the subject invention.

Embodiments of the subject invention provide novel and advantageous shape memory polymer (SMP) epoxies and composites, and methods of manufacturing the same. A three-dimensional (3D) printing technique can be used to enable the fabrication a pure thermoset SMP epoxy. A cryogenic sprayer assisted extrusion type 3D printing method can be used to print SMP epoxies and composites of an SMP epoxy (SMPE) and graphene nanoplatelets (GNP). The 3D printing precursor can be freeze sprayed (e.g., at or around a temperature of 10° C. or less) during and/or after the 3D printing. The freeze spraying can be done by spraying a fluid (e.g., tetrafluropropene) on the precursor. After 3D printing, the printed sample can be subjected to a cryogenic or nearly cryogenic (e.g., a temperature of less than 0° C., such as −10° C. or less) for a predetermined period of time (e.g., 24 hours or more).

The 3D printing techniques of embodiments of the subject invention the fabrication of near net shaped pure (i.e., not including any other polymers) thermoset SMP epoxies for the first time. Previously, only thermoplastic or highly functionalized co-polymeric thermoset systems could be 3D printed. Conventionally, thermoset based copolymers are mixed with secondary polymers and photoinitiator and inhibitors to achieve 3D printability using a stereolithography (SLA) technique. A main limitation posed by mixed thermoset copolymer SMP systems is the reduction in shape recovery rate due to irreversible deformation of the secondary copolymers. Therefore, to obtain a consistent recovery of programmed shape at constant recovery rate and prolonged period, a pure thermoset SMP epoxy is needed.

Extrusion-based 3D printing techniques display good printing tolerance and comparably faster print times for small and thin parts. Extrusion-based 3D printing is a computer-controlled layer-upon-layer deposition of polymer solutions and semi-molten polymers through a movable nozzle acting as an extrusion print head. Because 3D printed designs using this technique are material dependent, material selection for 3D printed components is of paramount importance. It is possible to fabricate thermoplastics and thermosets using an extrusion approach, and this is because thermoplastic pellets can be transformed to filament for extrusion printing. Extrusion of composites of thermoplastic polymers and graphene provide even more improvement in mechanical and thermal properties. Using SMPs as a 3D printing precursor provides advantages due to their functionality in such a role. Thermoplastic based SMPs (e.g., polyurethane or polyether ether ketone based SMP systems), which are physically cross-linked with one or more multifunctional cross-linkers, can be 3D printed by a fused deposition modeling (FDM) technique. Certain thermoset based copolymer SMPs with photoinitiator and inhibitor cross-linkers can be 3D printed into complex shapes using stereolithography (SLA) 3D printing techniques. Despite the advantages of 3D printing with SMP, 3D printed thermoplastic and thermoset copolymer SMP systems can also display a reduction in shape recovery rate due to irreversible deformation of the copolymers mixed into SMP polymeric system upon creep. Thus, an SMP epoxy system offers the capacity to achieve high recovery of shape memory effect, but over a prolonged period. SMP epoxy components are often fabricated by mold casting and injection die casting techniques. Such techniques may not be economically sustainable because the die cost is expensive when parts with intricate designs are needed. A 3D printing technique is therefore a preferable alternative, as it reduces fabrication cost. However, SMP epoxy components cannot be created by some widely used 3D printing techniques, such as FDM and SLA. SMP epoxy cannot be 3D printed through FDM (lack of melting point) as the print fails to solidify instantly; nor through SLA because it requires addition of various polymers and physical cross-linkers to make the SMP photosensitive. Embodiments of the subject invention can address these shortcomings by providing 3D printing techniques that can print pure thermoset SMP epoxy without any physical cross-linkers or chemical modification.

Embodiments of the subject invention provide SMP epoxy-based precursors without any chemical aid (e.g., no physical cross-linkers or chemical modification) and a novel cryogenic sprayer assisted extrusion 3D printing process. The process can be also employed to 3D print GNP-reinforced SMP epoxy composites. GNP has great ability to serve as an excellent mechanical and thermal reinforcement in SMP. The GNP-based nanocomposite part can be 3D printed for many applications, including but not limited to deployable systems, efficient actuation systems, and acoustic damping components.

Prior to the subject invention, pure SMP epoxy thermoset could not be extruded due to its low viscosity (25.6 centipoise (cP)), which causes the material to fail to retain the shape of the extruder and flow freely over the print bed. To achieve extrudability, embodiments of the subject invention increase the viscosity of the SMP epoxy (e.g., to greater than 700 cP, such as to ~800 cP or ~850 cP) by partially curing at room temperature and not by any chemical aid.

Figure 1E:
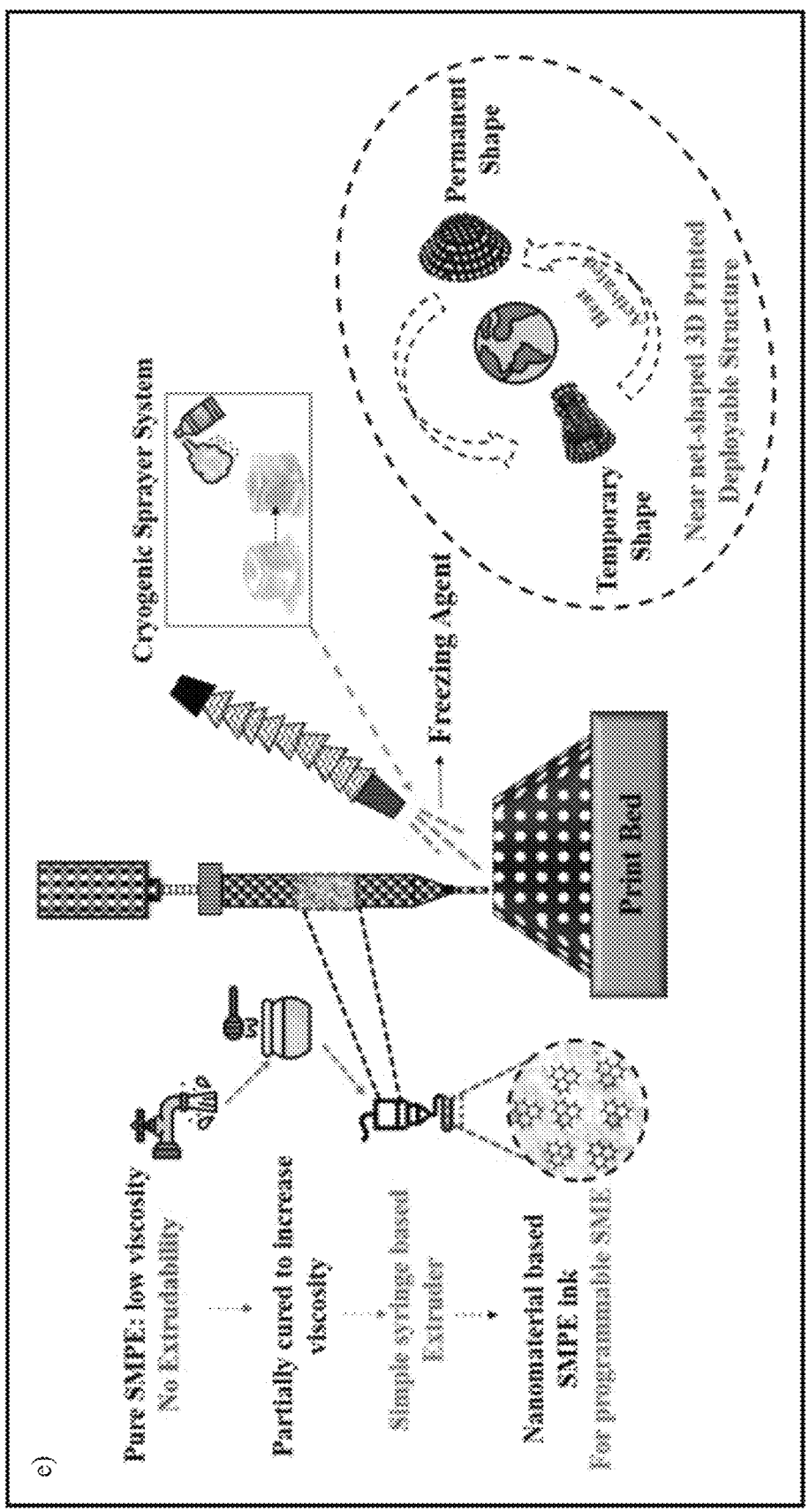
Figure 2:
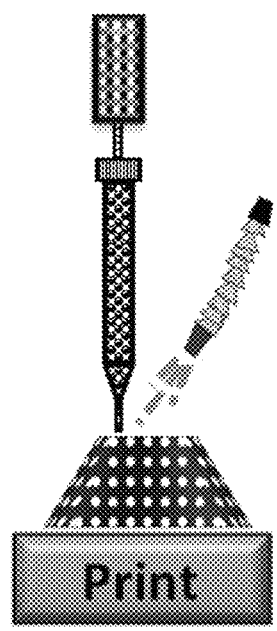
FIG. 2 is a schematic view of cryo-assisted three-dimensional (3D) printing of SMP epoxy and SMP epoxy-GNP composite, according to an embodiment of the subject invention.
Figures 3A, 3B, 3C:
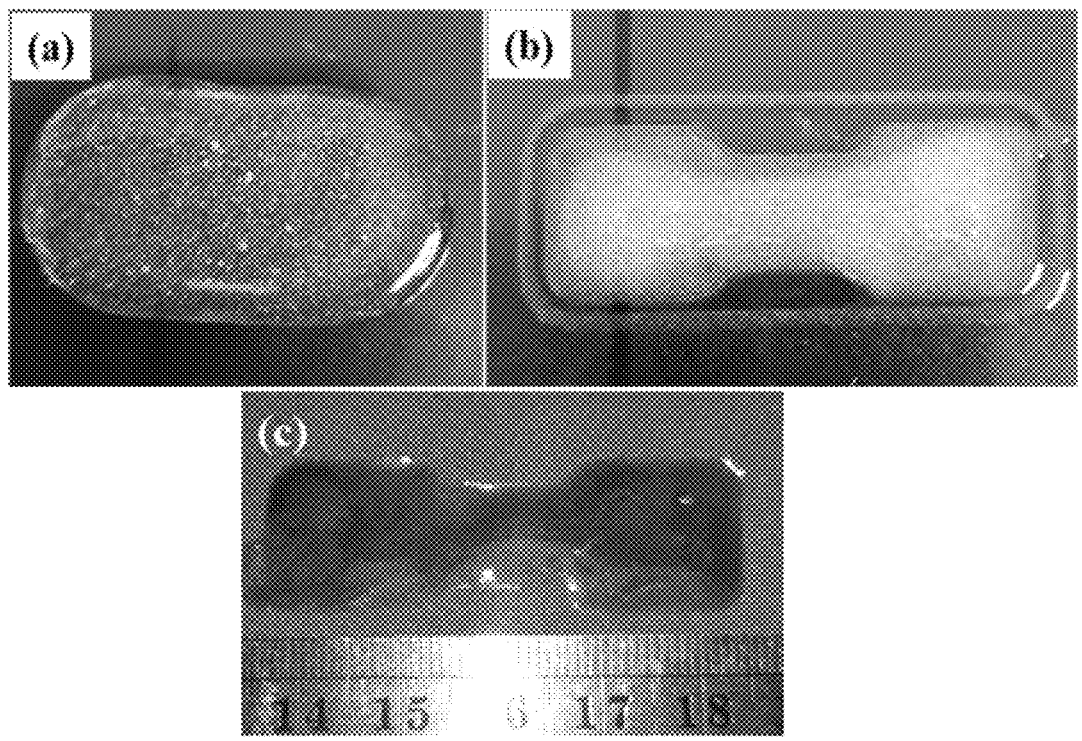
FIG. 3(a) is an image of a 3D printed SMP epoxy dog-bone shape prepared without a freezing agent.
FIG. 3(b) is an image of a 3D printed SMP epoxy dog-bone shape prepared with a freezing agent.
FIG. 3(c) is an image of a 3D printed SMP epoxy-GPN composite dog-bone shape prepared with a freezing agent.
Figure 9:
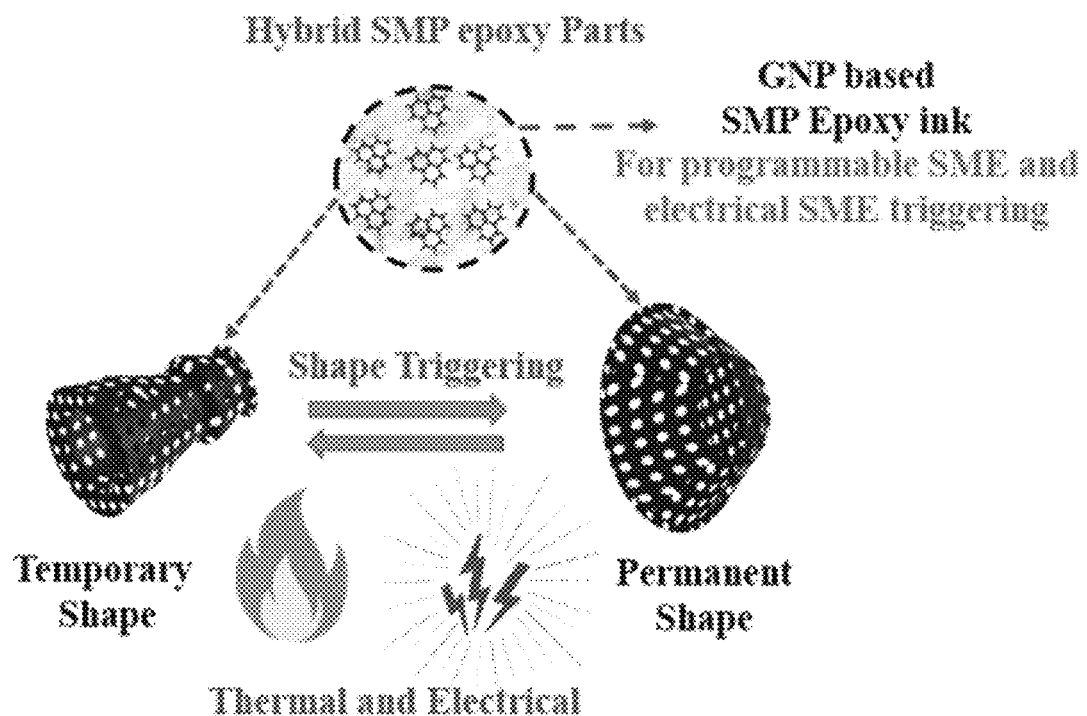
FIG. 9 is a schematic view of a GNP-based SMP epoxy nanocomposite part that can be both thermally and electrically triggered to transform its shape. Though the figure uses the terms "temporary shape" and "permanent shape", this is not meant to imply that the shape cannot be changed from the "permanent shape", but instead that this "permanent shape" is the typical shape before thermal and/or electrical triggering. That is, the composite can be changed from its "permanent shape" to its "temporary shape" via thermal and/or electrical triggering and then returned to its "permanent shape" by removing the thermal and/or electrical triggering and/or providing a different thermal and/or electrical trigger.

This novel approach enables extrudability of the pure SMP epoxy. A simple 3D dog-bone model was set as an initial test model to confirm the viability of these methods (see also FIGS. 3(b), 3(c), 10(a), 10(b), 14(a), and 14(b)). The highly viscous SMP epoxy ink can still fail to attain 3D construction capability without freeze spraying (see FIG. 3(a)) because each printed layer can coalesce with the previous layer, thus distorting the printed geometry. In conventional 3D printing, irrespective of FDM or SLA technique, each printed layer solidifies instantly, thus bearing the load of successive layers without print distortion. In the case of pure thermoset SMP epoxy, though, the high mobility of the polymeric chain, even when partially cured, can cause print distortion. The only way to achieve 3D printability of highly viscous SMP epoxy is by immobilizing the polymeric chain, and this can be done by freeze spraying (e.g., spaying a freezing agent) while printing each layer. This is represented in FIGS. 1(c), 1(e), and 2. The freezing agent can reduce the printed SMP epoxy layer temperature to below 10° C., immobilizing the polymeric chain, thus achieving printability of pure SMP epoxy. The printed structure retains the input geometry (see FIG. 3(b)), and even more advantageously exhibits shape memory effect (see FIGS. 7(a), 7(b), and 9), which was not affected by using the freeze spraying. Cryo-assisted 3D printing techniques of embodiments of the subject invention provide 3D printing technology for pure thermoset polymers. Efficient SMP epoxy actuation systems and other engineering components that require precision functionality can now be 3D printed on demand.

Embodiments of the subject invention provide an SMP epoxy-GNP composite (e.g., nanocomposite) that enables printing of 3D-printed parts with programmable shape memory effect at an accelerated recovery rate and with superior mechanical properties. Such a composite can include a low quantity of GNP in order to inhibit clogging of the extruder nozzle/syringe. The composite can include a weight percentage (wt %) of GNP of any of the following values, about any of the following values, at least any of the following values, or at most any of the following values: 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, or 0.3. For example, the composite can include 0.1 wt % of GNP. Such a composite ink can be electro-active, with shape change triggered by electrical heating (e.g., resistive heating) (see also FIG. 9). It is noted that both the SMP epoxies and SMP epoxy-GNP composites of embodiments of the subject invention can exhibit shape change triggered by direct (e.g., non-electrical) heating. The SMP epoxy on its own is electrically non-conductive and therefore may not have shape change triggered by electrical heating.

Embodiments of the subject invention provide cryo-system assisted, extrusion type 3D printing techniques, which can give electro-active SMP epoxy nanocomposite parts that can be used for many applications. Such applications include but are not limited to printing efficient actuation systems, self-deployable communication system, soft robotics, and acoustic dampeners. Polymeric parts are extensively used in military, medical, automotive, and industrial applications. All these domains can save time and money by adopting the 3D printing techniques of embodiments of the subject invention, as they are simple and avoid the extensive functionalization of polymers to achieve 3D printability.

Embodiments of the subject invention provide at least the following novelties over related art methods and materials: partial curing of pure SMP epoxy to increase its viscosity to make it extrudable; cryo-assisted 3D printing techniques to overcome the non-existent 3D printing technology for pure thermoset polymers; and SMP epoxy with added 2D nanomaterials (e.g., GNP) to make an insulating polymer electro-active with superior mechanical properties. SMP's are often referred to as active materials as they can change their shape and properties when subjected to external stimulus like heat. They have great technological applications in the fields of self-packaging/deploying structures, robotics, sensors, smart actuators, and bio-medical applications, among others. In the related art SMP's that can be 3D printed are part of a physically cross-linked co-polymer system and the shape recovery effect deteriorates due to irreversible deformation. On the other hand, chemically crosslinked pure SMP epoxies are not 3D printable in the related art. Generally, SMP epoxy components are fabricated by mold casting and injection die casting techniques. Embodiments of the subject invention enable the 3D printing of pure SMP epoxies and can be applied to other pure thermoset polymers as well. The 3D printing techniques add a new dimension to 3D printing polymers. The SMP epoxy nanocomposite inks of embodiments of the subject invention enable 3D printing of hybrid SMP epoxy parts that can be shape triggered not only by a thermal stimulus but also by an electrical stimulus. This allows engineers to design smart and energy efficient precision actuators that can be heavily used in defense, robotics, and medical industries.

Although GNP is discussed at length as a material for the SMP epoxy composites discussed herein, other materials can be used instead (or even in addition) to the GNP. For example, one-dimensional (1D) carbon nanotubes (CNT), 1D boron nitride nanotubes (BNNT), and/or two-dimensional (2D) boron nitride nanoplatelets (BNNP)) can be used with SMP epoxy as part of an SMP epoxy (nano)composite with enhanced shape memory programming capability. The GNP and CNTs are known to promote effective phonon conduction, thus improving the thermal conductivity of the SMP epoxy, which otherwise is a poor thermal conductor. 3D printed SMP epoxy parts with augmented thermal and electrical conductivity can trigger the shape memory effect at a higher recovery rate, thus helping engineers to design and 3D print energy efficient SMP epoxy actuation systems.

The cryo system can seamlessly integrate into any 3D printer. The cryo system can be a standalone sprayer unit or work in tandem with 3D printer. Any SMP can be used with embodiments of the subject invention, including thermoplastic based SMPs such as polynorbonene, polyurethane, or polyether ether ketone A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

Aromatic and aliphatic epoxies included diglycidyl ether of bisphenol A epoxy monomer (trademark name, EPON 826) ($M_w$=340 g mol$^{-1}$) and neopentyl glycol diglycidyl ether (NGDE) ($M_w$=216 g mol$^{-1}$), which were obtained from Sigma-Aldrich (St. Louis, Mo., USA) and Hexion Specialty Chemicals (Columbus, Ohio, USA), respectively. Curing agent poly(propylene glycol)bis(2-aminopropyl) ether from amine group (with trademark name as Jeffamine D230) ($M_w$=230 g mol$^{-1}$) was obtained from Huntsman (Woodlands, Tex., USA). The SMP epoxies were used as received.

Example 1—Synthesis of Slurry Form of SMP Epoxy-GNP Composite

The as-prepared SMP epoxy was a mixture of three liquid resins (the two epoxy compositions and one curing agent). A slurry form of the resin was prepared by partially curing the SMP epoxy without any chemical aid at 25° C. for 36 hours to increase the viscosity and allow for extrudability (see FIGS. 1(a) and 1(b) to show a representation in the viscosity before and after the curing, respectively). The precursor was further freeze sprayed to inhibit or prevent smudging and retain its shape (see FIG. 1(c)). The same approach was also performed in the preparation of a slurry form of SMP epoxy-GNP composite, after thoroughly mixing SMP epoxy and GNP composition together (see FIG. 1(d)).

It is difficult to use SMP epoxy resin mixture in its as-prepared state as a 3D printing precursor. The difficulty of using the resin mixture as a printing material is due to its viscosity, a fundamental material property. The epoxy mixture, in its liquid state at 25° C., has a viscosity of 25.6 centipoise (cP). The low viscosity of SMP makes it a highly flowable material, which smudges as it prints out of the syringe nozzle (see also FIG. 2; and see FIG. 3(a) for an example of how the SMP will not retain its dog-bone shape while printing due to its low viscosity).

Example 2—Fabrication of SMP Epoxy and SMP Epoxy-GNP Composite by 3D Printing 3D printing of a dog-bone shape of SMP epoxy and its graphene-based counterpart was performed using a Hyrel System 30M printer with a syringe dispensing system (SDS) extruder. Settings considered for the SDS extruder include software for the stepper motor, nozzle diameter, and "start/end" G-code. The 3D dog-bone models for printing were designed using SolidWorks CAD software. All STL files obtained from SolidWorks were processed by an open source free software Slic3r (http://slic3r.org/), an open-source 3D printing toolbox. Slic3r sliced the files into 200 μm thick layers to generate G-code instructions for the 3D printer. The G-code was created using the spiral option in the Slic3r software. The G-code was sent to the printer using Repetrel software, a proprietary 3D printer host software suite designed by Hyrel 3D company.

Before 3D printing, a glass slide was placed on the printer bed. The glass slide served as the plate where the material would be directly printed. Also, the viscosity of the SMP epoxy resin and the epoxy-graphene solution was determined using a viscometer. The SMP epoxy had a viscosity 730 cP, and it was drawn into a 60 milliliter (mL) plastic syringe. It was then capped with an 800 μm-ID 0.75" stainless steel deposition tip (Nordson EFD). The syringe was mounted into the SDS extruder of the 3D printer. The extruder nozzle was positioned at the bottom center of the printer bed, and the Z-position of the printer bed was set to zero position for the printing of the dog-bone shape samples. Printing occurred at a typical speed of 20 millimeters per second (mm/s), taking 2.5 minutes to print each sample. During printing, freeze spray aerosol was sprayed on the extruded material (using a setup like the one depicted in FIG. 2). This was done to inhibit or prevent material smudging because SMP epoxy is temperature-sensitive. After printing, the glass slide containing the printed samples was placed in the refrigerator. The printed samples were subjected to a low temperature of 10° C. for 24 hours to inhibit or prevent any further smudging that may occur, helping the material to retain the dog-bone shape configuration. The SMP epoxy-based samples were then allowed to cure for an additional 72 hours at room temperature. The rigid prints were demolded and gently removed from the glass slide at 40° C.

An appropriate viscosity of the SMP epoxy slurry is required for efficient extrudability of the precursor from the syringe nozzle. Achieving SMP epoxy extrusion with the appropriate nozzle diameter would result in good printing resolution. The SMP epoxy precursor was prepared by partial curing of the SMP epoxy liquid at 25° C. for 36 hours, with viscosity of about 800 cP. However, to overcome shear thinning behavior of the precursor, an additional process was added during and after 3D printing the dog-bone shape sample. The process was in two stages: (i) freeze spraying (e.g., at or around 10° C.) on the dog-bone shape sample during and after 3D printing, using a freeze spray component comprising tetrafluropropene; and (ii) subjecting the dog-bone sample to nearly cryogenic condition (−10° C.) for 24 hours by placing it in a refrigerator. Because shape fixing requires subjecting SMP epoxy far below the Tg (~20° C.) to retain its temporary shape, then this condition is borrowed and used on an SMP epoxy precursor for 3D printing. After 24 hours, the 3D printed sample successfully retained the dog-bone geometry after removing it from the refrigerator and leaving it at room temperature to be completely cured. The complete curing took another four days after removal from the refrigerator (see the result in FIG. 3(b)). Based on the successful extrusion of the SMP epoxy samples, this approach was employed to 3D print the composite of SMP epoxy and 0.1 wt % GNP (see FIG. 3(c)). The viscosity increases to 12,300 cP after adding 0.1 wt % GNP. The 0.1 wt % GNP was considered because a higher weight percent of GNP can lead to agglomeration and result in nozzle clogging, which could result in poor printing resolution.

Example 3—Uniaxial Tensile Test

Tensile behavior of the 3D printed samples from Example 2 was examined by performing uniaxial tensile characterization using a mechanical testing stage (SEMtester 1000, MTI Instruments, Inc., Albany, N.Y., USA). The mechanical testing stage load cell (4400 Newtons (N)) was used to perform tensile testing for casting. The operation of the stage was conducted using MTEST Quattro software (ADMET, Norwood, Mass., USA). The tests were performed by holding the sample between the tensile grip fixtures and applying a force that stretched the sample gauge length to a failure at a rate of 1 millimeter per minute (mm/min). Load-displacement data and plot was obtained from the software after the test is completed. Stress was then derived by normalizing load data with the cross-sectional area of the tensile sample. Strain data was obtained by analysis using the DLTdv (direct linear transformation) package in the MATLAB platform.

Figures 10A, 10B:
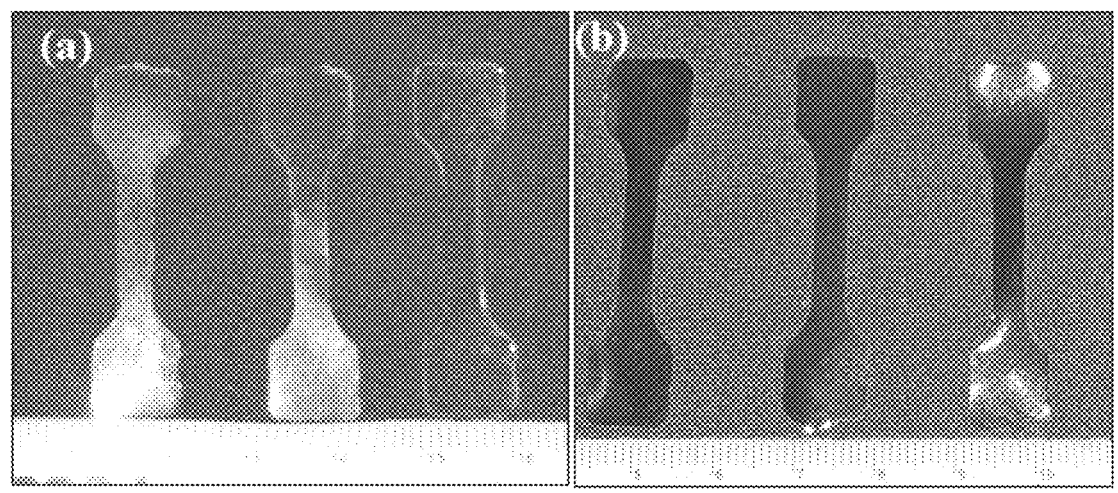
FIG. 10(a) shows images of 3D printed SMP epoxy dog-bone shape samples fabricated using a syringe extruder and room-temperature curing.
FIG. 10(b) shows images of 3D printed SMP epoxy-GNP composite dog-bone shape samples fabricated using a syringe extruder and room-temperature curing.
Figure 11:
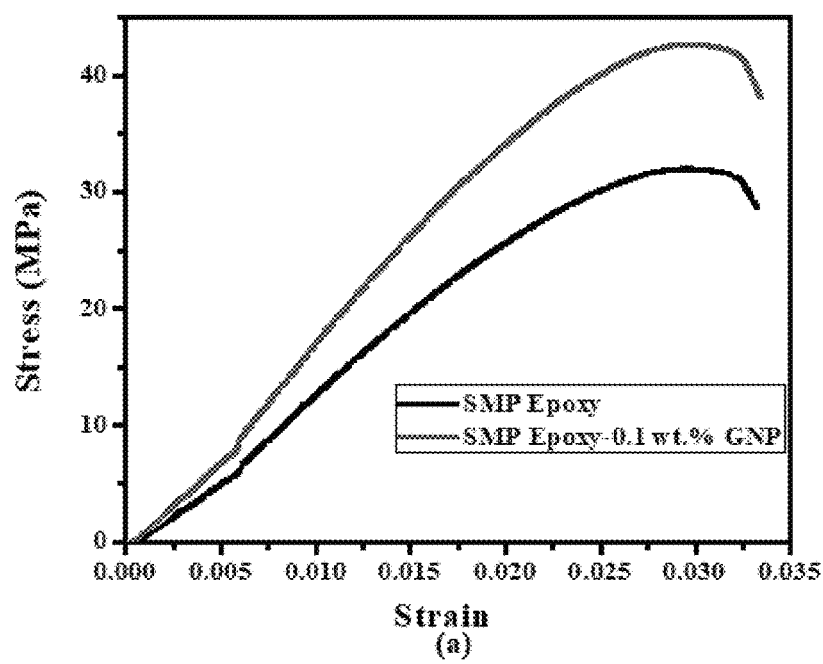
FIG. 11 is a plot of stress (in megaPascals (MPa)) versus strain (dimensionless) for an SMP epoxy (bottom curve) and a composite of SMP epoxy and 0.1 wt % GNP (top curve).

The 3D printed dog-bone shape samples of the SMP epoxy and GNP reinforced composite (each with dimensions of 19 mm×0.4 mm×0.6 mm) were used for the tensile tests. Images of the 3D printed SMP epoxy and GNP-based composite samples are shown in FIGS. 10(a) and 10(b), respectively. The tensile properties of the dog-bone shape samples were obtained from the stress-strain plot, which was deduced from load-displacement curves (see also FIG. 11). The corresponding mechanical properties deduced from the tensile test are displayed in Table 1.

The SMP epoxy sample received a boost of approximately 17% in its elastic modulus after GNP addition. The SMP epoxy-GNP composite also demonstrated approximately a 30% increase in the ultimate tensile strength compared to the SMP epoxy. Strain to failure of the SMP epoxy-0.1 wt % GNP composite showed only a marginal increase compared to the SMP epoxy. In addition to the results of the stress-strain response, SEM evaluation of fracture surfaces of printed SMP epoxy-GNP tensile sample was performed. The fractographs are useful to examine the influence of the printing process parameters and strengthening mechanisms on the surface feature of the printed samples.

TABLE 1

Tensile Properties of SMP Epoxy and SMP Epoxy-0.1 wt % GNP Composite

| Sample | Elastic Modulus (GPa) | Ultimate Tensile Strength (MPa) | Strain at failure (%) |
| --- | --- | --- | --- |
| SMP Epoxy | 1.22 ± 0.061 | 31.20 ± 1.56 | 3.22 |
| SMP Epoxy-GNP Composite | 1.63 ± 0.082 | 41.85 ± 2.09 | 3.18 |

Figures 12A, 12B:
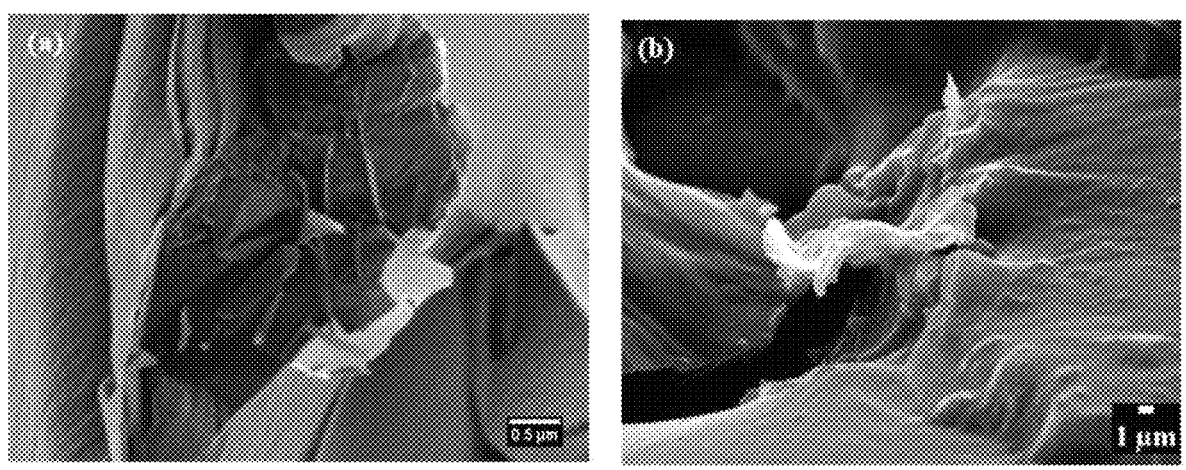
FIG. 12(a) is an SEM image of the fracture surface of an SMP epoxy-GNP composite, showing strengthening. The scale bar is 0.5 μm.
FIG. 12(b) is an SEM image of the fracture surface of an SMP epoxy-GNP composite, showing a crack-bridging mechanism. The scale bar is 1 μm.

FIG. 12(a) is an SEM image of the fracture surface of an SMP epoxy-GNP composite, showing strengthening (scale bar of 0.5 μm), and FIG. 12(b) is an SEM image of the fracture surface of an SMP epoxy-GNP composite, showing a crack-bridging mechanism (scale bar of 1 μm). FIGS. 12(a) and 12(b) reveal GNP positioning in SMP epoxy. The GNP serves as a strengthening and crack bridging agent in the SMP epoxy marked with a propagated crack. The high in-plane stiffness of GNP holds the structural integrity of the SMP epoxy together and prevents or inhibits the complete fracture of the SMP epoxy. This demonstrates the great potential of GNP in SMP composite fabricated by 3D printing using a syringe extruder, according to embodiments of the subject invention.

Example 4—Dynamic Mechanical Test

Dynamic mechanical characteristics were tested on the 3D printed SMP epoxy-based samples with dimensions of 10.70 millimeters (mm)×6.78 mm×0.48 mm using DMA 242 Artemis from NETZSCH Instruments (Burlington, Mass., USA). The samples were subjected to tensile deformation mode because of their small thickness, which is unsuitable for 3-point bending deformation. A small amplitude load of 5 μm was applied within a temperature range of from 24° C.-80° C. at a heating rate of 3 Kelvin per minute (K/min) and 1 Hertz (Hz). After test completion, the storage and loss moduli and tan delta curves were obtained using the DMA 242 software.

FIG. 13(a) is a plot of strength modulus (in MPa) versus temperature (in ° C.) for the SMP epoxy and the composite of SMP epoxy and 0.1 wt % GNP. The curve that is higher at 30° C. is for the composite, and the curve that is lower at 30° C. is for the SMP epoxy. FIG. 13(b) is a plot of tan delta (dimensionless) versus temperature (in ° C.) for an SMP epoxy and a composite of SMP epoxy and 0.1 wt % GNP. The curve that is higher at 35° C. is for the composite, and the curve that is lower at 35° C. is for the SMP epoxy.

FIGS. 13(a) and 13(b) show the dynamic storage moduli and loss tangent of SMP epoxy (~300 MPa; 0.9) and the composite (~1400 MPa; 1.5) printed at an infill angle (45°) in a rectilinear pattern and infill density (100%), respectively. The plot of storage moduli and loss tangent of the printed SMP epoxy-based samples are like dynamic mechanical properties profiles of the mold-cast samples. Storage moduli of the samples display a typical steep decrease from 24° C. to 80° C. (FIG. 13(a)). The printed SMP epoxy-0.1 wt % GNP composite exhibits a higher storage modulus (5 times greater) than that of the SMP epoxy. The loss tangent of the samples shows a bell curve profile; it increases to the peak and decreases to zero (FIG. 13(b)). The SMP epoxy-0.1 wt % GNP composite also displays a higher loss tangent compared to the SMP epoxy. The steep decrease in the storage moduli of the printed samples, as temperature increases, is due to an increase in mobility of the polymer chain molecules. Incorporation of the GNP in the SMP epoxy matrix accounts for higher storage modulus of the composite. GNP, which has functionalized edges, creates excellent adhesion at the epoxy-GNP interface. The interface allows GNP to transfer its in-plane stiffness to the corresponding matrix; hence, an increase of approximately five times in storage modulus is observed between 24° C.-34° C., compared to the SMP epoxy. Also, printing a dog-bone shape part (<1 mm thickness) makes it possible for the composite to receive appreciable GNP response during tensile loading. As with the behavior of mold cast samples, at higher temperature, more cooperative segmental mobility is activated and is more dominant than the GNP contribution. This leads to a storage modulus of zero above 40° C.

Further, the high loss tangent demonstrated by the composite can be attributed to the regions that showed fair GNP dispersion and functionalized graphene in the SMP epoxy to achieve fair interface. This bonding enables elastic energy in the matrix to be transferred to the graphene membrane where dissipation mechanisms (e.g., ripple formation and propagation, intermolecular interaction between layers and interlayer slippage) are mobilized. The tangent delta peak shift is observed from the SMP epoxy curve at 43° C. and the SMP epoxy-0.1 wt % GNP composite at 36° C. (see FIG. 13(b). The shift is noticeable compared with that of mold-cast samples, and it can be a result of the curing process of the precursors. Mold-cast samples are cured with relatively high temperature (100° C.); whereas, the 3D printing precursor is cured at room temperature (25° C. or around 25° C.). Typically, room curing of polymers has weakened crosslinking (because it is not heat-induced) compared with that of oven curing. Thus, curing of 3D printing SMP epoxy precursors at room temperature results is them being not quite as strong as that of oven-cured samples. This accounts for the tangent delta peak temperatures (36° C. and 45° C.) for 3D printed SMP samples being lower than that of mold-cast SMP epoxy samples (thus, in some embodiments of the subject invention, the SMP epoxy precursor can be oven cured (e.g., at a temperature of 50° C. or 100° C. or more) instead of being room temperature cured). This is further reflected in the Tg values of the 3D printed SMP epoxy composite sample of 45° C. (FIG. 6), which is lower than that of mold-cast SMP epoxy composite of 50° C. Also, GNP integration in some regions of the SMP epoxy matrix can also prevent or inhibit crosslinking of the SMP resin monomers. This further reduces the crosslinking density; hence, the left shift of the tangent delta peak.

Example 5—Microstructural Characterization

A JEOL JSM-633OF field emission scanning electron microscope (FE-SEM) operating at 15 kilovolts (kV) and working distance of 15 mm was used for the characterization of 3D printed SMP epoxy-GNP composites. Fracture surfaces were prepared by subjecting the samples under a tensile load until breakage point and examining the broken surfaces within the gauge length region of the samples. Samples were sputter-coated with gold for 50 seconds before examining in SEM to avoid artifacts due to charging. Fracture surfaces of the 3D printed samples were observed under SEM to examine interface and surface features of GNP in the SMP epoxy matrix.

A micro-Raman spectroscopy analysis was performed using a Spectra-Physics (Model 3900S, California, USA) equipped with Ti-sapphire crystal (514 nanometers (nm)) as the target. The Spectra-Physics also included a detector with 4 $cm^{-1}$ spectral resolution from Kaiser Optical Systems, Inc. (Michigan, USA), a laser power (18 milliwatts (mW)) and a spot size of 2 µm. Differential scanning calorimetry (DSC) measurements were prepared in an argon environment using SDT Q600 (TA instrument, Newcastle, USA) to obtain their glass transition temperature. The specimens were heated to 200° C. at a heating rate of 10° C./min. The glass transition temperature (Tg) values of epoxy SMP and graphene foam-epoxy SMP composites were determined from the inflection temperatures in the DSC curves.

Figures 4A, 4B, 4C, 4D:
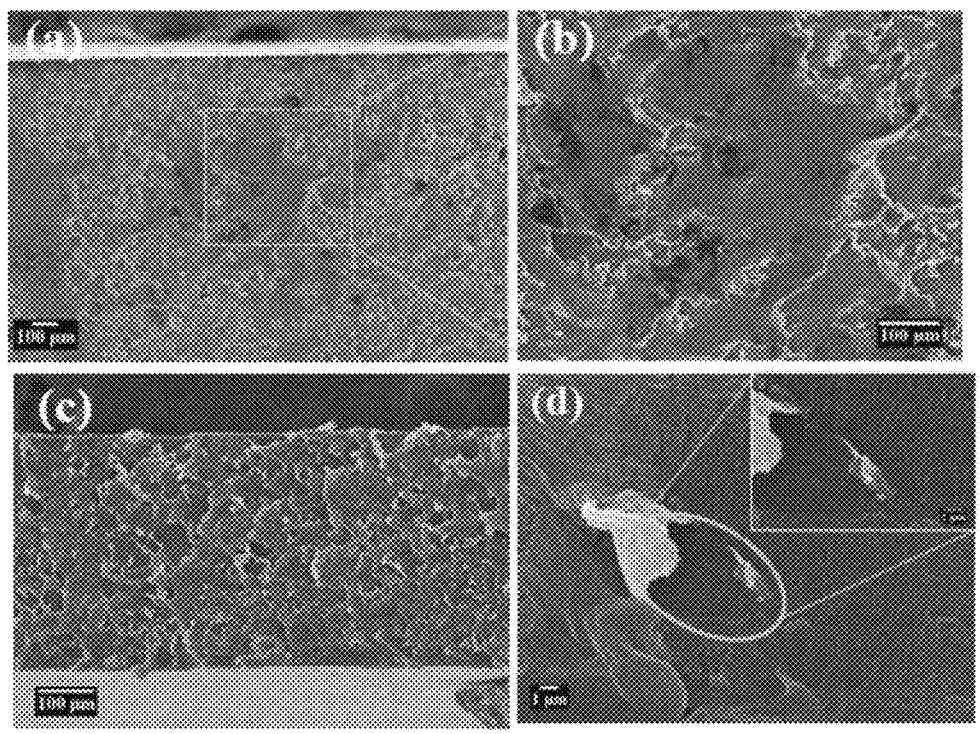
FIG. 4(a) is a scanning electron microscope (SEM) micrograph of a cross-section of a 3D printed dog-bone shape SMP epoxy sample at a magnification of 100×. The scale bar is 100 microns (μm).
FIG. 4(b) is an SEM micrograph of a cross-section of the 3D printed dog-bone shape SMP epoxy sample of FIG. 4(a) at a magnification of 750×. The scale bar is 100 μm.
FIG. 4(c) is an SEM micrograph of a cross-section of a SMP epoxy-GNP composite sample revealing rough surfaces. The scale bar is 100 μm.
FIG. 4(d) is an SEM micrograph of a cross-section of the SMP epoxy-GNP composite sample of FIG. 4(c) at a higher magnification, showing the interface between graphene and the SMP epoxy. The scale bar is 1 μm.

FIG. 4(a) is an SEM micrograph of a cross-section of a 3D printed dog-bone shape SMP epoxy sample at a magnification of 100x. The scale bar is 100 µm. FIG. 4(b) is an SEM micrograph of a cross-section of the 3D printed dog-bone shape SMP epoxy sample of FIG. 4(a) at a magnification of 750x. The scale bar is 100 µm. FIG. 4(c) is an SEM micrograph of a cross-section of a SMP epoxy-GNP composite sample revealing rough surfaces. The scale bar is 100 µm. FIG. 4(d) is an SEM micrograph of a cross-section of the SMP epoxy-GNP composite sample of FIG. 4(c) at a higher magnification, showing the interface between graphene and the SMP epoxy. The scale bar is 1 µm.

FIGS. 4(a) and 4(b) show smooth and slightly rough surface regions of SMP epoxy. The higher magnification micrograph in FIG. 4(b) shows that there exist largely smooth surface regions in between the rough surface regions. These are typical surface characteristics of thermoset epoxy consisting of disordered chains. The significant irregular protuberances or rough surfaces observed on the side view surface (see FIG. 4(c)) could be attributed to the embedded GNP that is strongly bonded with the SMP epoxy, with no nanolayer pull out. FIG. 4(d) shows an SMP epoxy well coated on the GNP and less graphene pull out from the matrix. This indicates an excellent interface between the SMP epoxy and GNP, and this results in strong physical bonding that can influence the mechanical properties of the SMP epoxy-GNP composite.

Figure 5A:
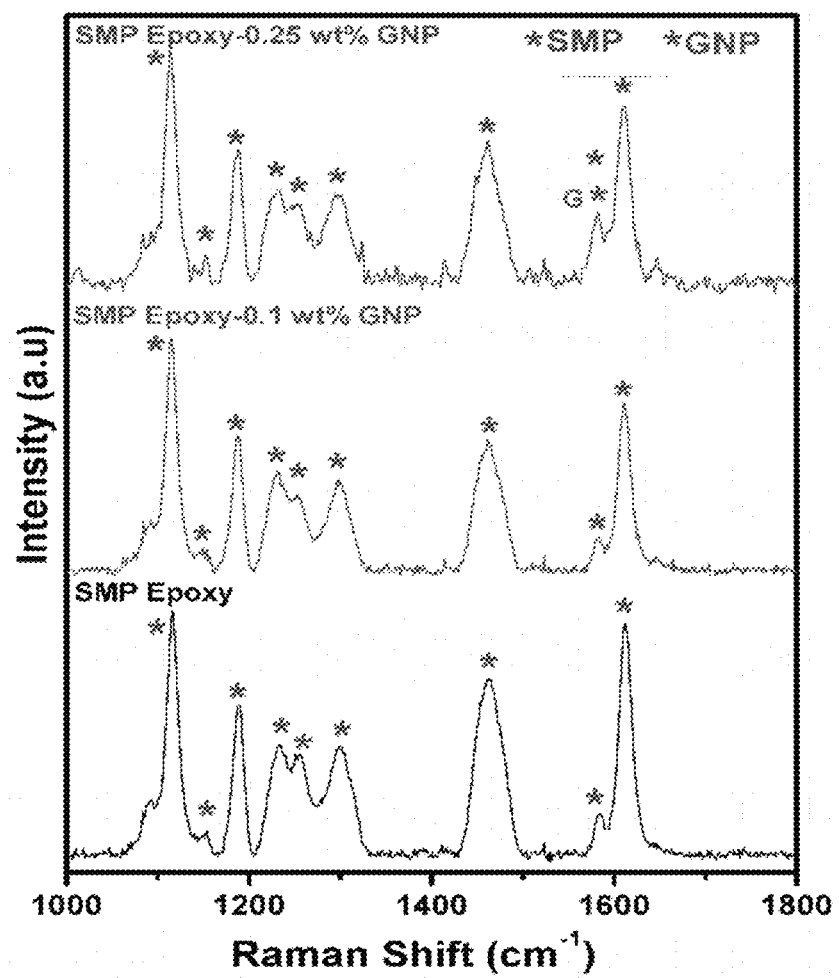
FIG. 5(a) is a plot showing the Raman spectroscopy of an SMP epoxy (bottom curve), a composite of SMP epoxy and 0.1 wt % GNP (middle curve), and a composite of SMP epoxy and 0.25 wt % GNP (top curve), for wavenumbers 1000 $cm^{-1}$ to 1800 $cm^{-1}$.
Figure 5B:
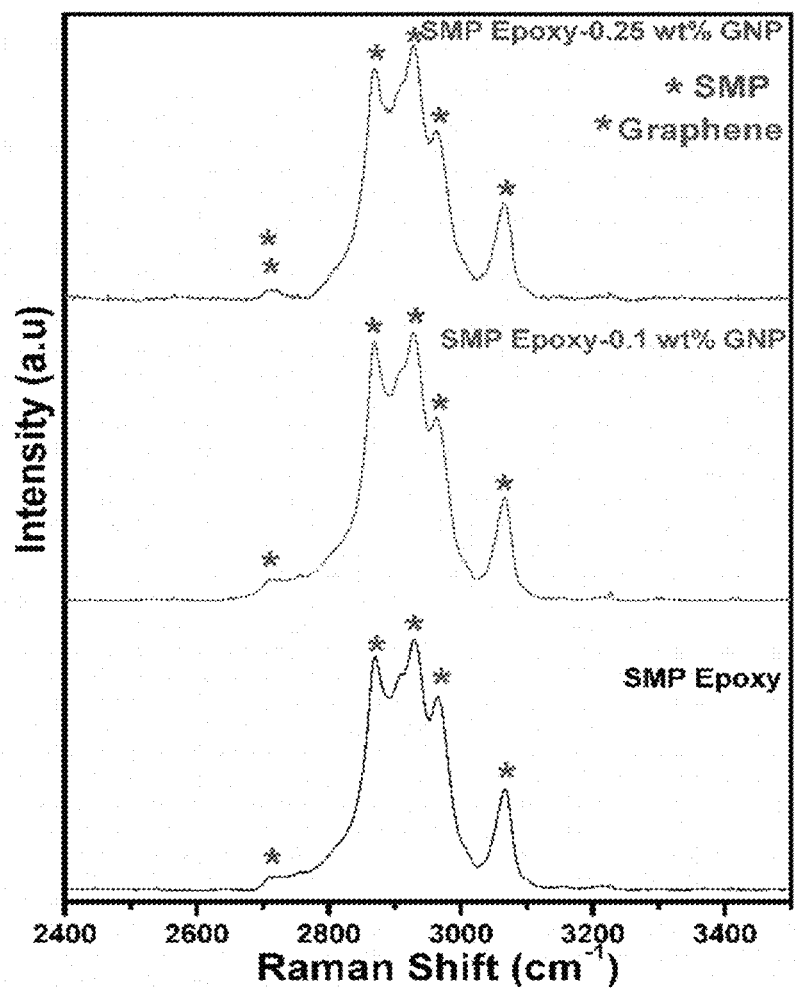
FIG. 5(b) is a plot showing the Raman spectroscopy of an SMP epoxy (bottom curve), a composite of SMP epoxy and 0.1 wt % GNP (middle curve), and a composite of SMP epoxy and 0.25 wt % GNP (top curve), for wavenumbers 2000 $cm^{-1}$ to 4000 $cm^{-1}$.
Figure 5C:
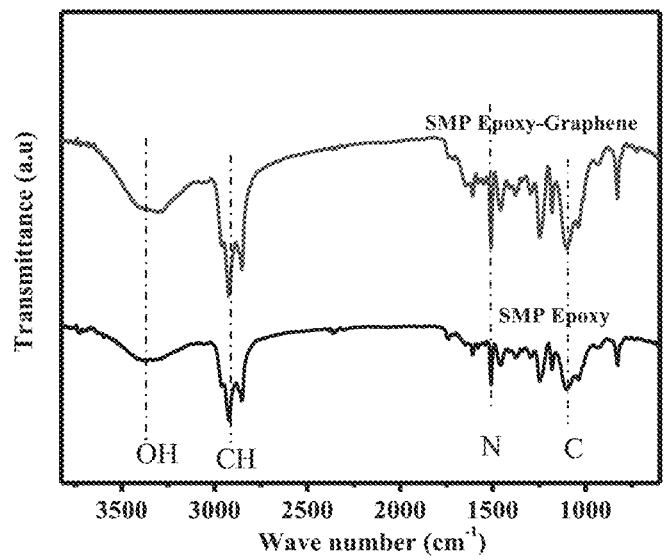
FIG. 5(c) is a plot showing the Fourier-transform infrared spectroscopy (FTIR) of an SMP epoxy (bottom curve) and a composite of SMP epoxy and 0.1 wt % GNP (top curve).

FIG. 5(a) is a plot showing the Raman spectroscopy of an SMP epoxy (bottom curve), a composite of SMP epoxy and 0.1 wt % GNP (middle curve), and a composite of SMP epoxy and 0.25 wt % GNP (top curve), for wavenumbers 1000 cm-1 to 1800 $cm^{-1}$. FIG. 5(b) is a plot showing the Raman spectroscopy of the SMP epoxy (bottom curve), the composite of SMP epoxy and 0.1 wt % GNP (middle curve), and the composite of SMP epoxy and 0.25 wt % GNP (top curve), for wavenumbers 2000 $cm^{-1}$ to 4000 $cm^{-1}$. FIG. 5(c) is a plot showing the Fourier-transform infrared spectroscopy (FTIR) of the SMP epoxy (bottom curve) and the composite of SMP epoxy and 0.1 wt % GNP (top curve).

Raman and FTIR spectra results were obtained from the microstructural characterization to understand phase and bonding characteristics of the 3D printed SMP epoxy-GNP samples. Raman spectra of GNP powder were used, where it unveils the three typical graphene peaks representing graphene molecular fingerprints. The D, G, and 2D peaks are observed at 1360 $cm^{-1}$, 1580 $cm^{-1}$, and 2700 $cm^{-1}$, respectively. Referring to FIGS. 5(a) and (b), SMP epoxy peaks were recognized at wavenumbers of typical epoxy peaks. Some of the noticeable peaks are at 1113 $cm^{-1}$, 1162 $cm^{-1}$, 1318 $cm^{-1}$, 1460 $cm^{-1}$, 1580 $cm^{-1}$, 1608 $cm^{-1}$, and 3069 $cm^{-1}$. At these respective peaks, strong C—O—C epoxy ring, C—H waggings, $CH_3$ bending, $CH_2$ deformation vibration, shoulder, and strong aromatic rings stretch are observed. The shoulder aromatic signature from SMP epoxy appears at 1580 $c^{-1}$, which is almost the same graphitic signature as those from GNP.

Referring to FIG. 5(a), the graphitic signature (G peak) is not detected though the shoulder band was noticed at 1580 $cm^{-1}$, which is similar to the Raman spectrum for SMP epoxy. The G peak could not be confirmed because the shoulder bands from the Raman spectra of SMP epoxy and SMP epoxy-0.1 wt % GNP has the same peak intensity. To detect the G peak, GNP content was increased from 0.1 to 0.25 wt %. With increased GNP content, the SMP epoxy-0.25 wt % GNP composite Raman band revealed the graphitic signature (G peak) at 1581 $cm^{-1}$. The detection of the G peak was confirmed based on the peak intensity increase at the shoulder band (1581 $cm^{-1}$). The ratio of the peak intensity of the shoulder peak (at 1580 $cm^{-1}$) to strong aromatic peak (at 1608 $cm^{-1}$) for Raman spectrum of SMP epoxy is 0.85; whereas, the peak intensity ratio for Raman spectrum of SMP epoxy-0.25 wt % cGNP composite is 0.96 (12% increase in peak intensity). The broad hump of D peak was not visible, which suggests that extremely low thermal treatment could facilitate the defect-free region in the graphene by coalescing of nanographene islands. Good dispersion of graphene also prevents or inhibits defects due to agglomeration, thereby accounting for the invisible D peak. The wavenumber shift in G peak of GNP (FIG. 5(a)) could be attributed to the slight shrinkage that occurs during polymerization of the SMP epoxy chains. The presence of the 2D peak could be observed in the 0.25 wt % GNP composition, as shown in FIG. 5(b). The 2D peak intensity in this composition is slightly higher than that of the 0.1 wt % GNP and SMP epoxy composition.

Referring to FIG. 5(c), the absorption bands at 3348 $cm^{-1}$ and 2970 $cm^{-1}$ are ascribed to saturated O—H and C☐H stretching vibrations. Bending vibration of ether C=O corresponds to the characteristic absorbance peak at 1100 $cm^{-1}$ while the peak at 1535 $cm^{-1}$ can be attributed to stretching vibration of N—H. High peak intensity displayed by C—H and N—H is due to greater change in dipole moment concerning distance than that of O—H and C—O functional groups. The peak width of the SMP epoxy-0.1 wt % GNP composite decreased at absorption band 3348 cm and slightly increased at absorption bands 1535 $cm^{-1}$ and 2970 $cm^{-1}$ compared with that of SMP epoxy. This implies that less hydrogen bonding or interaction occurs at 3348 cm and some intermolecular interactions at 1535 $cm^{-1}$ and 2970 $cm^{-1}$.

Example 6—Glass Transition Temperature (Tg) Behavior

Figure 6:
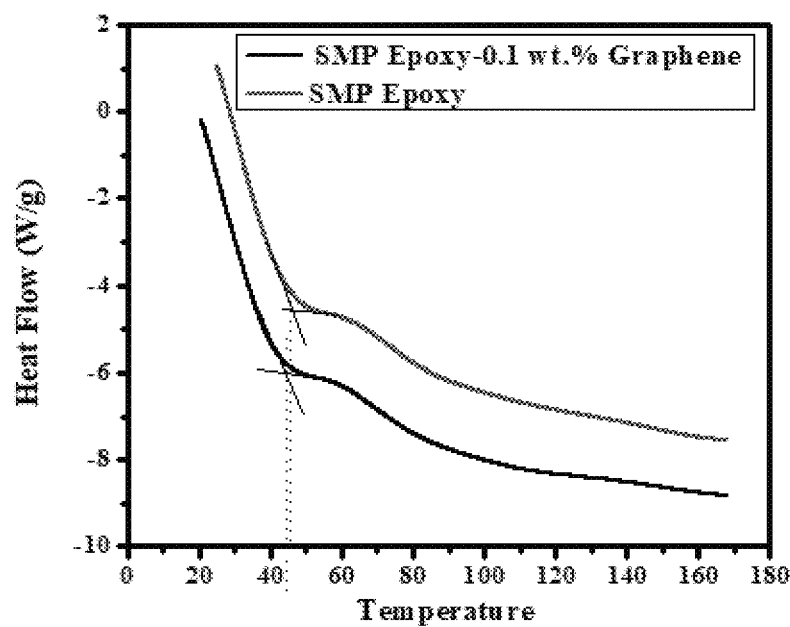
FIG. 6 is a plot of heat flow (in Watts per gram (W/g)) versus temperature (in ° C.) for an SMP epoxy (top curve) and a composite of SMP epoxy and 0.1 wt % GNP (bottom curve).

Glass transition (Tg) behavior of the 3D printed SMP epoxy-based samples was investigated, using an SDT Q600 instrument, after completely curing the 3D printed dog-bone shape at room temperature. FIG. 6 is a plot of heat flow (in Watts per gram (W/g)) versus temperature (in ° C.) for an SMP epoxy (top curve) and a composite of SMP epoxy and 0.1 wt % GNP (bottom curve). Referring to FIG. 6, the 3D printed samples were subjected to the heating rate of 10° C./min from room temperature to 175° C. The DSC thermogram curves of the SMP epoxy and SMP epoxy-GNP samples showed inflection at around 45 and 44° C., respectively. The inflection region is the Tg region, and it also represents the small endothermic peak that can be attributed to enthalpy relaxation of the amorphous SMP epoxy from unfavorable chain orientations towards a more stable chain conformation. FIG. 6 shows that the SMP epoxy-GNP composite has a marginal Tg decrease compared to the SMP epoxy sample. GNP addition could occlude crosslinking of the SMP epoxy chains. Further, low GNP content does not provide enough physical interaction with the SMP epoxy. Hence, these factors could result in lower Tg of the composite. Layer height and print infill pattern are factors that could also affect the Tg of the 3D printed samples; they could control the orientation of the GNP in the sample. This implies that increased layer height could create an avenue for different GNP orientations. The sample layer height in this example was 0.6 mm, which could be thin or thick depending on the applications. The height was used because it contributed to retaining the dog-bone shape geometry and no smudging of the SMP epoxy precursors. The layer height of the sample as an important parameter could allow for GNP orientation, but this does not significantly affect the composite Tg due to low GNP content.

Example 7—Shape Memory Behavior

Thermal stimulation of printed SMP epoxy and SMP epoxy-GNP composite samples with dimensions of 48 mm×1.1 mm×0.4 mm was performed by using a hot plate heating source at a temperature of 70° C. The stimulation propels deployment of the sample from its temporary bent shape to its permanent flat shape (see also FIG. 9). Though the terms "temporary shape" and "permanent shape" are used, this is not meant to imply that the shape cannot be changed from the "permanent shape", but instead that this "permanent shape" is the typical shape before thermal and/or electrical triggering. That is, the composite can be changed from its "permanent shape" to its "temporary shape" via thermal and/or electrical triggering and then returned to its "permanent shape" by removing the thermal and/or electrical triggering and/or providing a different thermal and/or electrical trigger.

Figures 7A, 7B:
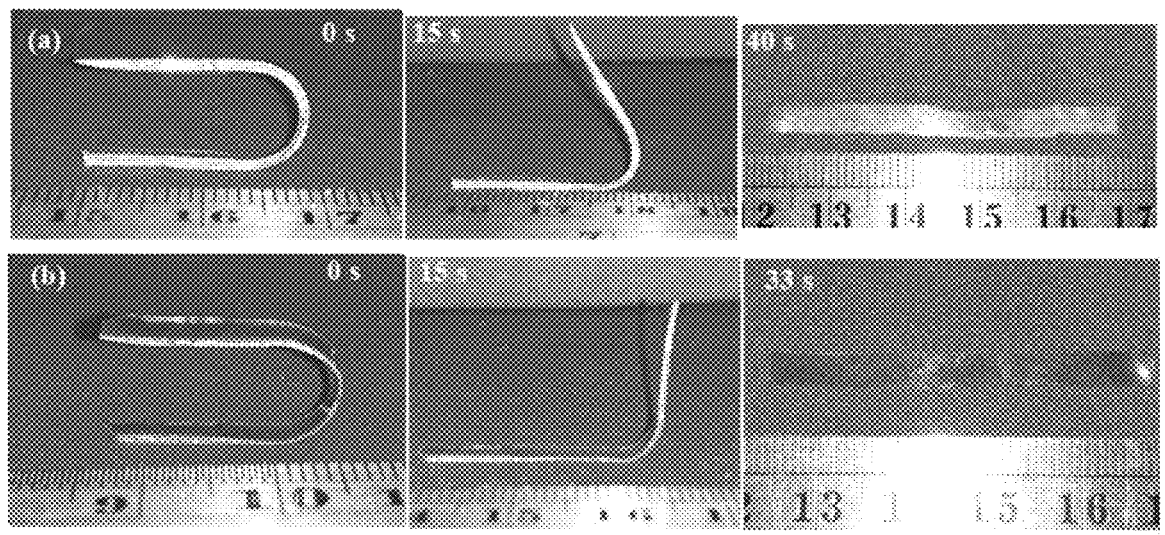
FIG. 7(a) shows three images demonstrating shape recovery of a pre-deformed 3D printed sample of an SMP epoxy actuated by direct heat from a hot plate.
FIG. 7(b) shows three images demonstrating shape recovery of a pre-deformed 3D printed sample of a composite of SMP epoxy and 0.1 wt % GNP, actuated by direct heat from a hot plate.
Figure 8:
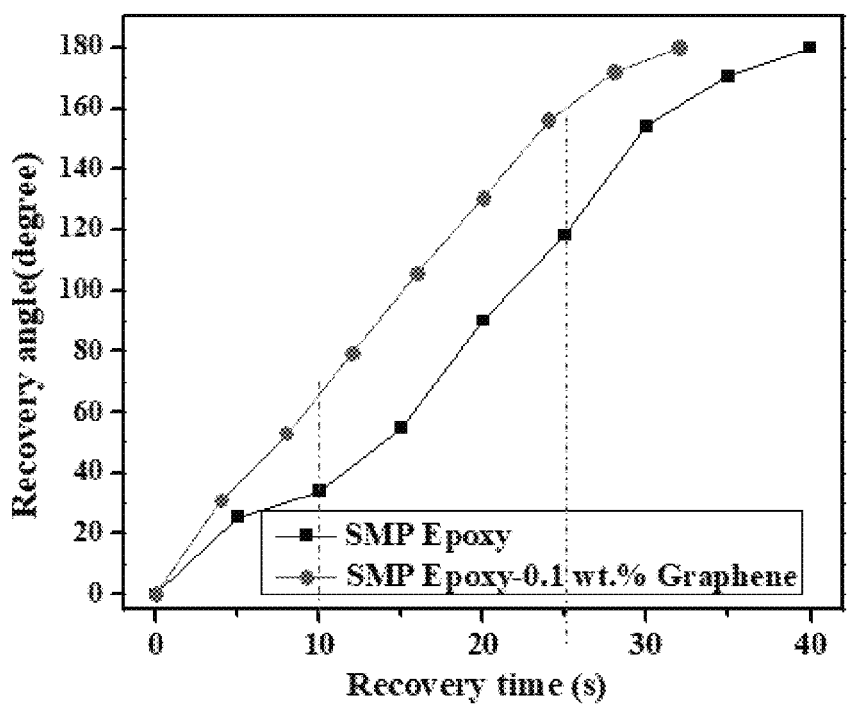
FIG. 8 is a plot of recovery angle (in degrees) versus recovery time (in seconds (s)) for a 3D printed SMP epoxy (bottom curve) and a 3D printed composite of SMP epoxy and 0.1 wt % GNP (top curve).

Qualitative and quantitative evaluation of shape recovery of the samples was obtained via fold-deploy tests. FIGS. 7(a) and 7(b) show the qualitative shape recovery images of bent shapes of SMP epoxy and SMP epoxy-GNP composite, respectively. The images were captured from recorded shape recovery videos of the samples during thermal stimulation. Both the SMP epoxy and its composite recovered entirely to their respective original shapes. The recovery images thus attest that any object printed with the SMP epoxy through syringe-based extrusion techniques according to embodiments of the subject invention can exhibit full shape recovery. Moreover, at a recovery temperature of 70° C. and in a time of 15 seconds, the printed composite displayed a larger recovery angle compared with that of the SMP epoxy. The larger recovery angle experienced by the composite can be attributed to excellent thermal conduction and high stiffness of GNP reinforcement in the SMP epoxy matrix. This implies that the composite has a faster recovery rate than the SMP epoxy. FIG. 8 shows the recovery angle profile concerning recovery time for the 3D printed SMP epoxy and its composite. The slope of the profile represents the recovery rate of the samples. Referring to FIG. 8, the slope of the SMP epoxy-0.1 wt % GNP composite is higher than that of SMP epoxy. This is corroborated with the values of recovery rates in a recovery time range of 10 seconds and 25 seconds (as marked with the vertical dashed lines on FIG. 8). Recovery rates of the SMP epoxy and SMP epoxy-GNP composites were 4.3 and 5.0 degree/second, respectively. This indicates that recovery rate performance of the composite is ~16% higher than that of the SMP epoxy. This also shows that the 3D printed samples can demonstrate complete shape recovery.

Further, a mere 0.1 wt % GNP addition in the SMP epoxy enhanced the shape recovery rate of the 3D printed composite. This shows the efficacy of the graphene-based reinforcement in the 3D printed SMP generally. GNP efficacy can be ascribed to its intrinsic properties, such as its high thermal conductivity and stiffness. Less GNP agglomeration helps in improving heat transfer within the matrix system, contributing to recovery rate improvement of the SMP epoxy-GNP system. GNP addition also synergizes well with the SMP epoxy precursor viscosity and process parameter values to produce printed parts of good quality. Achieving good quality 3D print by extrusion techniques provides near-net-shape SMP parts. Also, the 3D printed SMP epoxy can be transformed to GNP electroactive nanocomposite parts after GNP addition (see FIG. 9). This facilitates the design of energy-efficient actuation and deployable systems for smart applications.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of three-dimensional (3D) printing a shape memory polymer (SMP)-based ink, the method comprising:
providing an SMP epoxy;
curing the SMP epoxy at a first temperature to increase its viscosity to at least 500 centipoise (cP) and provide a first cured SMP epoxy;
providing the first cured SMP epoxy to an extruder syringe;
performing extrusion-based 3D printing of the first cured SMP epoxy to provide a printed SMP epoxy;
freeze-spraying the printed SMP epoxy with a freezing agent at a second temperature of 10° C. or less to provide a freeze-sprayed SMP epoxy;
curing the freeze-sprayed SMP epoxy at a third temperature to provide the SMP-based ink.

2. The method according to claim 1, further comprising freeze-spraying the first cured SMP epoxy with the freezing fluid at the first temperature after the first cured SMP epoxy exits the extruder syringe while the first cured SMP epoxy is being extrusion-based 3D printed.

3. The method according to claim 1, further comprising freezing the freeze-sprayed SMP epoxy at a fourth temperature of 10° C. or less for a predetermined amount of time prior to curing the freeze-sprayed SMP epoxy at the third temperature.

4. The method according to claim 1, the first temperature being room temperature, and the third temperature being room temperature.

5. The method according to claim 1, the SMP epoxy comprising polynorbonene, polyurethane, or polyether ether ketone.

6. The method according to claim 1, the freezing agent comprising aerosol tetrafluropropene.

7. The method according to claim 1, the SMP epoxy comprising no polymers other than the SMP, and
the SMP of the SMP epoxy having no physical crosslinkers or chemical modification.

8. A method of three-dimensional (3D) printing a shape memory polymer (SMP)-composite ink, the method comprising:
providing an SMP epoxy comprising a nanomaterial additive;
curing the SMP epoxy at a first temperature to increase its viscosity to at least 500 centipoise (cP) and provide a first cured SMP epoxy;
providing the first cured SMP epoxy to an extruder syringe;
performing extrusion-based 3D printing of the first cured SMP epoxy to provide a printed SMP epoxy;
freeze-spraying the printed SMP epoxy with a freezing agent at a second temperature of 10° C. or less to provide a freeze-sprayed SMP epoxy;
curing the freeze-sprayed SMP epoxy at a third temperature to provide the SMP-composite ink,
the nanomaterial additive being present in the SMP epoxy at a weight percentage (wt %) of 0.2 or less.

9. The method according to claim 8, further comprising freeze-spraying the first cured SMP epoxy with the freezing fluid at the first temperature after the first cured SMP epoxy exits the extruder syringe while the first cured SMP epoxy is being extrusion-based 3D printed, and
the freezing agent comprising aerosol tetrafluropropene.

10. The method according to claim 8, further comprising freezing the freeze-sprayed SMP epoxy at a fourth temperature of 10° C. or less for a predetermined amount of time prior to curing the freeze-sprayed SMP epoxy at the third temperature.

11. The method according to claim 8, the first temperature being room temperature, and the third temperature being room temperature.

12. The method according to claim 8, the SMP epoxy comprising polynorbonene, polyurethane, or polyether ether ketone.

13. The method according to claim 8, the nanomaterial additive being graphene nanoplatelets (GNP), one-dimensional (1D) carbon nanotubes (CNT), 1D boron nitride nanotubes (BNNT), or two-dimensional (2D) boron nitride nanoplatelets (BNNP).

14. The method according to claim 13, the nanomaterial additive being GNP.

15. The method according to claim 13, the SMP epoxy comprising no polymers other than the SMP, and
the SMP of the SMP epoxy having no physical crosslinkers or chemical modification.

16. A method of three-dimensional (3D) printing a shape memory polymer (SMP)-composite ink, the method comprising:
providing an SMP epoxy comprising a nanomaterial additive;
curing the SMP epoxy at a first temperature to increase its viscosity to at least 700 centipoise (cP) and provide a first cured SMP epoxy;
providing the first cured SMP epoxy to an extruder syringe;
performing extrusion-based 3D printing of the first cured SMP epoxy to provide a printed SMP epoxy;
freeze-spraying the printed SMP epoxy with a freezing agent at a second temperature of 10° C. or less to provide a freeze-sprayed SMP epoxy;
curing the freeze-sprayed SMP epoxy at a third temperature to provide the SMP-composite ink,
the nanomaterial additive being present in the SMP epoxy at a weight percentage (wt %) of 0.1 or less,
the method further comprising freeze-spraying the first cured SMP epoxy with the freezing fluid at the first temperature after the first cured SMP epoxy exits the extruder syringe while the first cured SMP epoxy is being extrusion-based 3D printed, the freezing agent comprising aerosol tetrafluropropene, the method further comprising freezing the freeze-sprayed SMP epoxy at a fourth temperature of 10° C. or less for a predetermined amount of time prior to curing the freeze-sprayed SMP epoxy at the third temperature, the first temperature being room temperature, and the third temperature being room temperature, the SMP epoxy comprising polynorbonene, polyurethane, or polyether ether ketone, the nanomaterial additive being graphene nanoplatelets (GNP), the SMP epoxy comprising no polymers other than the SMP, and the SMP of the SMP epoxy having no physical cross-linkers or chemical modification.

\* \* \* \* \*